US010161586B2

(12) United States Patent
Gloss et al.

(10) Patent No.: US 10,161,586 B2
(45) Date of Patent: Dec. 25, 2018

(54) LIGHT DEVICE WITH MULTIPLE AND SEPARATE BANDS FOR MOTOR VEHICLES

(71) Applicant: Varroc Lighting Systems, s.r.o., Senov u Noveho Jicina (CZ)

(72) Inventors: Tomas Gloss, Vitkov (CZ); Jakub Hruska, Hlucin (CZ); Tomas Mateju, Bartosovice na Morave (CZ)

(73) Assignee: VARROC LIGHTING SYSTEMS, S.R.O., Senov u Noveho (CZ)

( * ) Notice: Subject to any disclaimer, the term of this patent is extended or adjusted under 35 U.S.C. 154(b) by 0 days.

(21) Appl. No.: 15/897,530

(22) Filed: Feb. 15, 2018

(65) Prior Publication Data

US 2018/0238510 A1 Aug. 23, 2018

(30) Foreign Application Priority Data

Feb. 17, 2017 (CZ) ...................... 2017-93

(51) Int. Cl.
*F21S 41/24* (2018.01)
*G02B 27/30* (2006.01)
*F21S 41/20* (2018.01)
*G02B 1/04* (2006.01)
*F21V 5/02* (2006.01)
(Continued)

(52) U.S. Cl.
CPC .............. *F21S 41/24* (2018.01); *F21S 41/125* (2018.01); *F21S 41/151* (2018.01); *F21S 41/285* (2018.01); *F21V 5/02* (2013.01); *G02B 1/04* (2013.01); *G02B 27/30* (2013.01); *F21Y 2103/10* (2016.08); *F21Y 2113/10* (2016.08); *F21Y 2115/10* (2016.08)

(58) Field of Classification Search
CPC ........ F21S 41/24; F21S 41/285; F21S 41/125; F21S 41/151; G02B 1/04; G02B 27/30; F21V 5/02
See application file for complete search history.

(56) References Cited

U.S. PATENT DOCUMENTS

| 6,097,549 A | 8/2000 | Jenkins et al. |
| 2002/0097354 A1 | 7/2002 | Greiner |

FOREIGN PATENT DOCUMENTS

| DE | 4322607 C1 | 6/1994 |
| KR | 20080086122 A | 9/2008 |
| WO | 2012016047 A1 | 2/2012 |

OTHER PUBLICATIONS

Search Report from Corresponding Czech Application PV 2017-93 dated Nov. 10, 2017 (3 pages).

*Primary Examiner* — Joseph L Williams
(74) *Attorney, Agent, or Firm* — Hovey Williams LLP

(57) ABSTRACT

The light device contains first and second rows of light sources wherein rows are arranged next to each other, collimating elements associated with the light sources to convert their generated light to collimated light, and a light guide to bind the collimated light and emit it from the light guide output surface. Between the collimating element output and the light guide output surface, an optical means is arranged to divide the collimated light to at least two individual, spatially separated light beams, wherein the first light beam is formed by part of the collimated light passing by the optical means, and the second light beam is produced by passing another part of the collimated light through a refractive surface of the optical means. The first and second light beams are displayed on the output surface in the form of separate bands, namely the first and second band (A, B).

11 Claims, 10 Drawing Sheets

(51) Int. Cl.
  *F21S 41/151* (2018.01)
  *F21S 41/125* (2018.01)
  *F21Y 103/10* (2016.01)
  *F21Y 113/10* (2016.01)
  *F21Y 115/10* (2016.01)

LIGHT DEVICE WITH MULTIPLE AND SEPARATE BANDS FOR MOTOR VEHICLES

FIELD OF THE INVENTION

The invention relates to a light device for motor vehicles. Thus, the invention belongs to the field of design of signal lamps and headlights and relates to a light device fitted with lighting units to ensure providing of various light functions.

BACKGROUND INFORMATION

A light device for motor vehicles, comprises multiple light sources wherein each of these light sources provides a different light function or contributes to ensuring the required emission characteristic of the light trace. Individual light sources are generally mounted in a shaped carrier housing of the lamp or headlight. A light source emits light rays and optical elements represent a system of refractive and reflective surfaces and interfaces of optical environments that influence the direction, intensity and frequency of light rays within the creation of the output light trace.

The document US2002097354 discloses a light device for motor vehicles adapted to provide blending of light from a limited number of light sources, especially LED's that are situated on a common carrier. The light source is inserted in a cavity where a metal-plated surface is found that reflects light through the side walls to the optical system, which is used to change the position of a part of the light in the particular optical system.

The document KR20080086122 discloses a design of a light device adapted to compose white light by means of a limited number of light sources, especially by using colored RGB sources. Here, the optical principle uses reflection of light from a surface, which is used to change the position of a part of light in the particular optical system.

The object of the invention is to design a light device, especially for motor vehicles, that can be adapted to designer requirements for the external appearance of the product. The solution based on the invention will make it possible for the light device to have the same output optical surface for different light functions. The optical system is advantageously arranged in such a way to produce blending of the light functions and to create light bands or strips on the output surface that have a merging effect.

SUMMARY OF THE INVENTION

The object of the invention is fulfilled by a light device for motor vehicles in accordance with the invention, comprising the first row and second row of light sources wherein the first row and second row are arranged next to each other, collimating elements associated with the light sources to convert light generated by the light source to collimated light, and a light guide to bind the collimated light and to emit it from the output surface of the light guide. Between the output of the collimating elements and the output surface, an optical element is arranged to divide the collimated light emitted by the light sources of the same row to at least two individual, spatially separated light beams. The first light beam is formed by the part of the said collimated light that passes by the optical element and the second light beam is produced by passing of another part of the said collimated light through a refractive surface of the optical element, the first light beam and the second light beam being displayed on the output surface in the form of separate bands, namely the first and second band. In other words, the above said optical element comprises at least one refractive surface configured for a passage through the refractive surface and refraction caused by this passage, of a part of the collimated light produced by the light sources of the same row and passed through the output, producing a discrete second light beam. The second light beam is spatially separated from a first light beam consisting of another part of the said collimated light that has passed through the output, which part passes by the optical element, the first light beam and the second light beam being displayed on the output surface in the form of separate bands, namely the first and second band.

In one of the embodiments, the optical element, light guide and the pair of rows of light sources and collimating elements are symmetrical with respect to the plane on which the said two rows are connected.

In one of the embodiments, the said optical element is a prism comprising a pair of input refractive surfaces situated in such a way that either of them is situated against the outputs of the collimating elements of one of the rows of light sources, and against the pair of the input refractive surfaces, a pair of opposite output refractive surfaces to divide the collimated light emitted from the same row into just two discrete, spatially separated light beams.

In another one of the embodiments, the said optical element is an optical prism comprising a pair of input refractive surfaces arranged in such a way that either of them is situated against the outputs of the collimating elements of one of the rows of light sources, and against the pair of the input refractive surfaces, a pair of opposite output refractive surfaces. The optical prism is connected to the outputs of the collimating elements of both the rows of the light sources in such a way that a part of collimated light emitted by the light sources of both the rows passes through the optical prism in the places of this connection, i.e. outside the area of the refractive surfaces, forming the third discrete light beam, which is displayed on the output surface in the form of a separate third band.

In one of the embodiments, the light guide, optical prism and collimating elements of both the rows form one integral part, especially made of plastic.

In another one of the embodiments, the optical element comprises an output peak situated on the outputs of the collimating elements of both the rows of the light sources and including two connected refractive surfaces, either of them being situated against the outputs of the collimating elements of one row of the light sources, and against the output peak, an opposite input peak situated at the input of the light guide and including two connected refractive surfaces to divide the collimated light emitted from the same row into just two discrete, spatially separated light beams.

In another one of the embodiments, the optical element comprises an output peak situated on the outputs of the collimating elements of both the rows of the light sources and including two refractive surfaces, either of them being situated against the outputs of the collimating elements of one row, and a non-refractive surface mutually connecting the said two refractive surfaces, and against the output peak, an opposite input peak situated at the input of the light guide and including two refractive surfaces and a non-refractive surface mutually connecting these refractive surfaces, the non-refractive surfaces being arranged for direct passage of a part of collimated light emitted from the same row through these non-refractive surfaces in the form of a discrete third light beam, which is displayed on the output surface as a separate third band.

The output peak and the collimated elements of both the rows can form one integral part together, and the input peak and the light guide form another integral part together.

The refractive surfaces can be arranged in such a way for the light beams passing through the light guide to be parallel to each other.

Either of the rows of light sources may be designed to provide a different optical function.

Either of the rows of light sources may comprise light sources of a different color.

DESCRIPTION OF THE DRAWINGS

The invention will be clarified in a more detailed way with the use of its embodiment examples with references to attached drawings, where.

EXAMPLES OF EMBODIMENTS OF THE INVENTION

Figure 2:
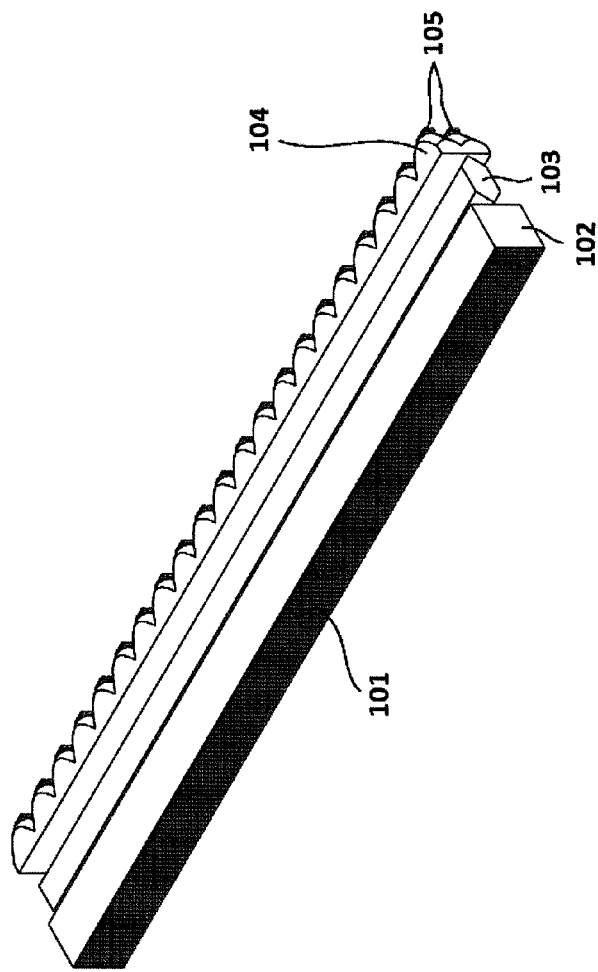
FIGS. 1, 2 and 3 show a perspective view of the first example of an embodiment of the light device in accordance with the invention.
Figure 1:
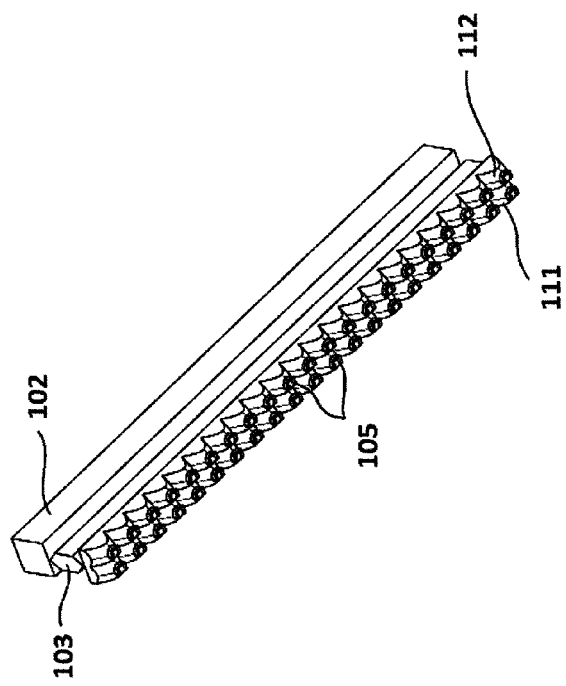
Figure 4:
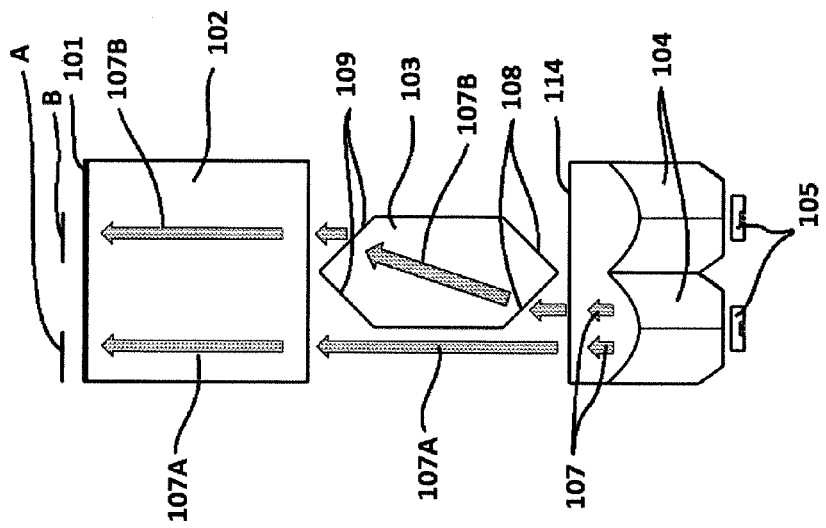
FIG. 4 shows a cross-sectional view of the first embodiment example of the light device, schematically indicating individual light beams.
Figure 3:
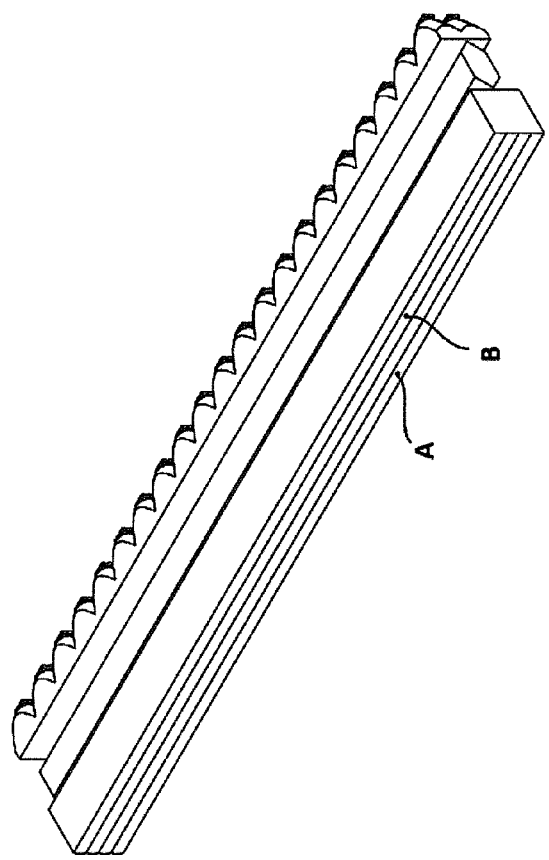
Figure 6:
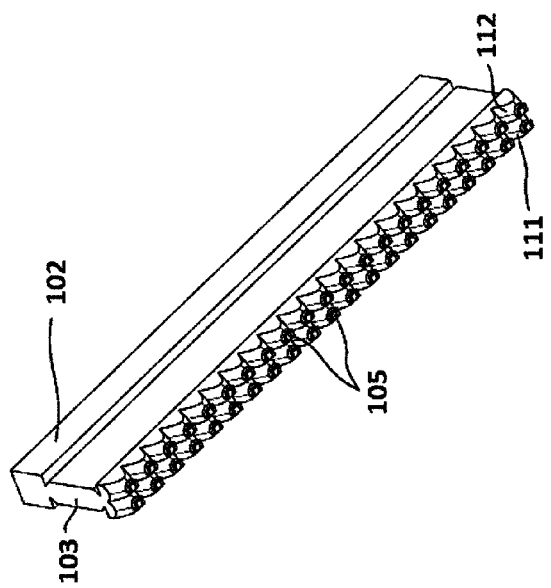
FIGS. 6, 7 and 8 show a perspective view of the second example of an embodiment of the light device in accordance with the invention.

FIGS. 1 to 5 show the first embodiment of the light device in accordance with the invention. The light device comprises two rows 111 and 112 of light sources 105 arranged next to each other, preferably LED sources, either row being used to provide one light (optical) function. The light device further comprises collimating elements 104, which can be, e.g., collimators or lenses, a prism 103, and a light guide 102, which is can be a light guide of the type referred to as "blade". On the prism 103, a part of collimated light 107 from one light function is substituted with a part of collimated light of the other function. A part of collimated light 107 from one optical function is unbound from the collimating element 104, passes from the collimating element 104 at its output 114, and passes by the prism 103 and is directly bound into the light guide 102, where it produces the first light beam 107A. The other part of collimated light 107 emitted from the collimating element 104 at its output 114 is bound to the prism 103 through the refractive surface 108, then passes through the prism 103 under a certain angle and at the output of the prism 103 it is refracted back to the original direction thanks to the refractive surface 109. Then, this light is bound to the light guide 102. The prism 103 has caused that the part of collimated light 107 that forms the second light beam 107B has changed its position within the optical system on the output surface 101. The said solution applies to the other optical function as well, where the principle is mirror-inverted. Light stripes or bands A and B are displayed on the output surface 101 of the light guide 102 in the above-mentioned way. Either optical function produces two light beams 107A, 107B, which are displayed on the output surface 101 as two bands A and B.

Figure 5:
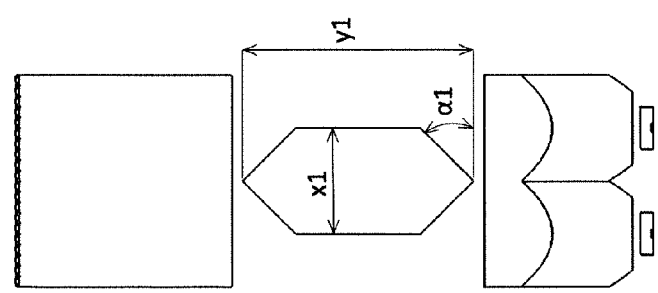
FIG. 5 shows a cross-sectional view of the first embodiment example of the light device with the indication of dimensional parameters.
Figure 8:
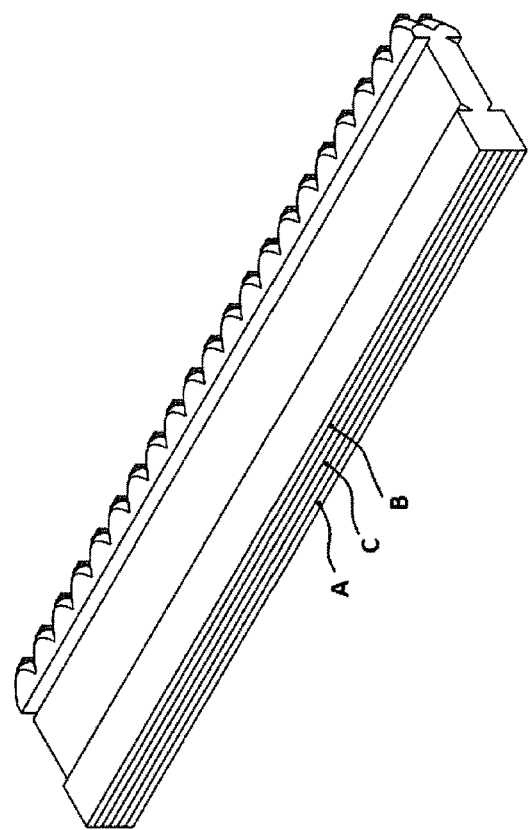
Figure 7:
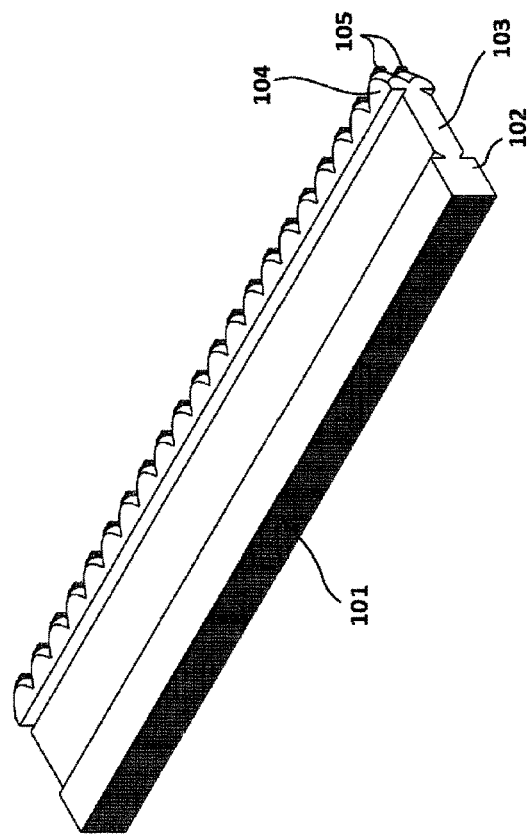

FIG. 5 shows a cross-sectional view of the light device in accordance with the first embodiment with its dimensional parameters. The height y1 of the prism 103, its width x1 and angle α1 are subject to the following relationship, where n1 is the refractive index of the material:

$$y1 = \frac{x1}{2}\left(tg(\alpha 1) + tg\left(\left(\frac{\pi}{2} - \alpha 1\right) + a\sin\left(\frac{\sin(\alpha 1)}{n1}\right)\right)\right)$$

FIGS. 6 to 10 show the second embodiment of the light device in accordance with the invention. The light device comprises two rows 111 and 112 of light sources 105 arranged next to each other, preferably LED sources, either row can be used to provide one light (optical) function. The light device further comprises collimating elements 104, which can be, e.g., collimators or lenses, a prism 103, and a light guide 102, which can be of the "blade" type. A part of collimated light 107 from one optical function (i.e. from one of the rows 111, 112) is unbound from the collimating element 104, passes by the prism 103 and is directly bound into the light guide 102, where it produces the first light beam 107A. The other part of collimated light 107 emitted from the collimating element 104 is bound to the prism 103 through the refractive surface 108, then passes through the prism 103 under a certain angle and at the output of the prism 103 it is refracted back, preferably to the original direction thanks to the refractive surface 109. Then, this part of the light is bound to the light guide 102, where it produces the other light beam 107B. The prism 103 has caused that a part of collimated light 107 has changed its position within the optical system on the output surface 101. In this embodiment, the prism 103 is connected to the collimating elements 104 and also to the light guide 102 while the part of the collimated light 107 that passes from the collimating element 104 through its output 114 in the place where the collimating element 104 is connected to the prism 103, does not change its direction, and having entered the light guide 102 through the place of connection of the light guide 102 to the prism 103, it produces the third beam 107C, which is displayed on the output surface 101 as the middle band C. The said solution applies to the other optical function as well, where the principle is mirror-inverted. Thus, in this embodiment of the light device, either row 111, 112 of light sources 105 produces three separate light beams 107A, 107B and 107C, which are displayed on the output surface 101 as three discrete bands A, B and C. Since either row 111, 112 can implement a separate optical function, each optical function produces the three said bands A, B and C on the output surface 101. The prism 103, light guide 102 and collimating elements 104 can be connected to each other to form one part.

Figure 10:
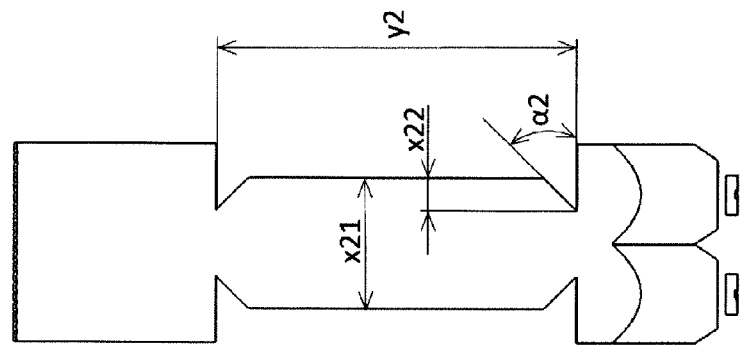
FIG. 10 shows a cross-sectional view of the second embodiment example of the light device with the indication of dimensional parameters.
Figure 9:
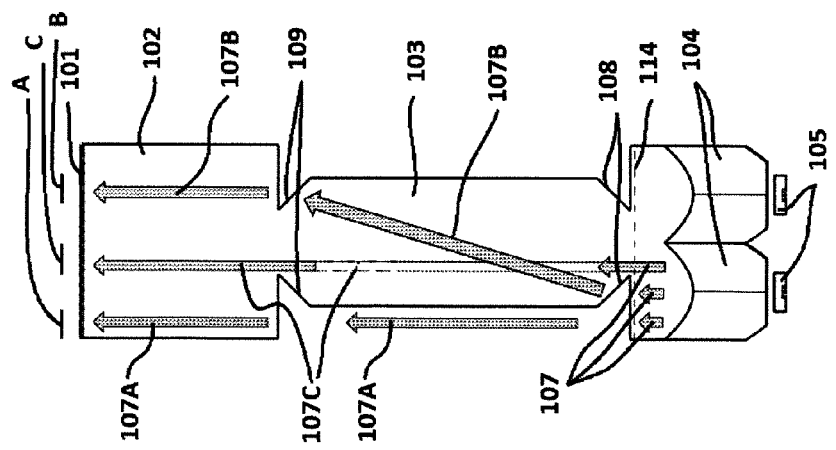
FIG. 9 shows a cross-sectional view of the second embodiment example of the light device, schematically indicating individual light beams.
Figure 12:
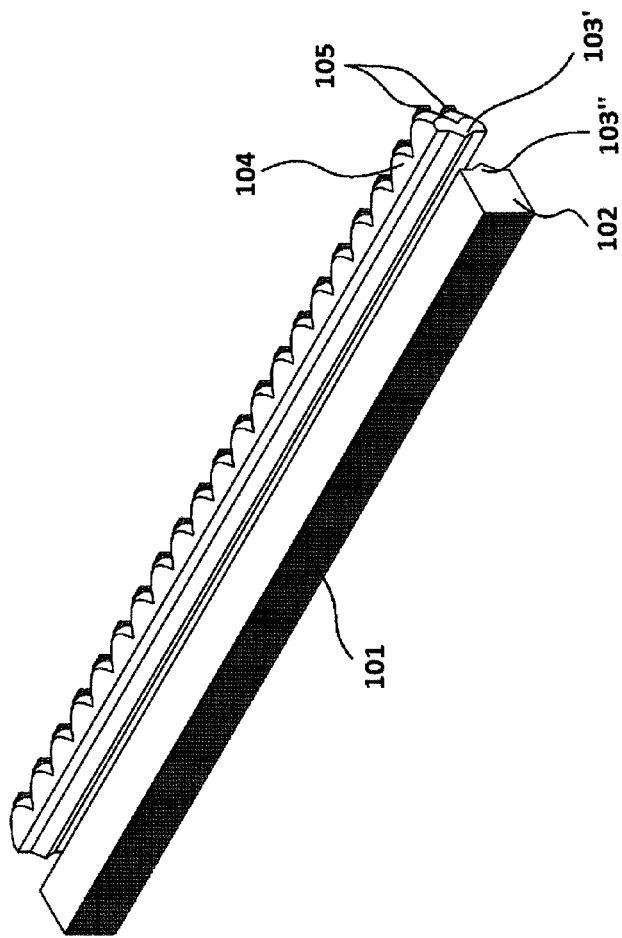
FIGS. 11, 12 and 13 show a perspective view of the third example of an embodiment of the light device in accordance with the invention.
Figure 11:
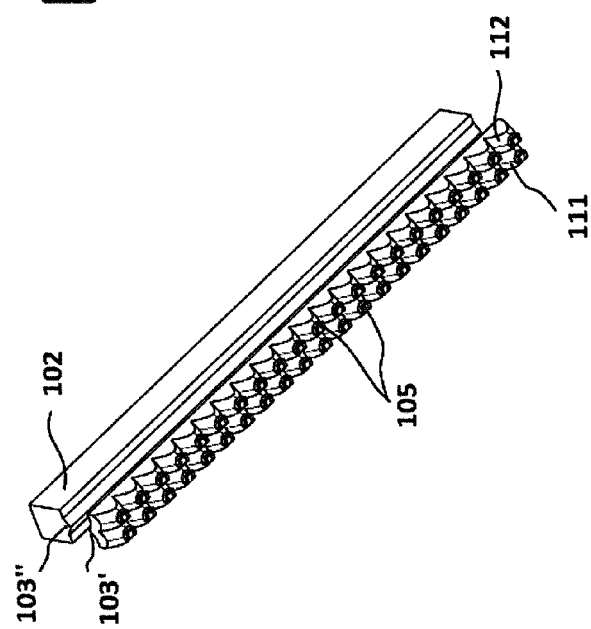
Figure 14:
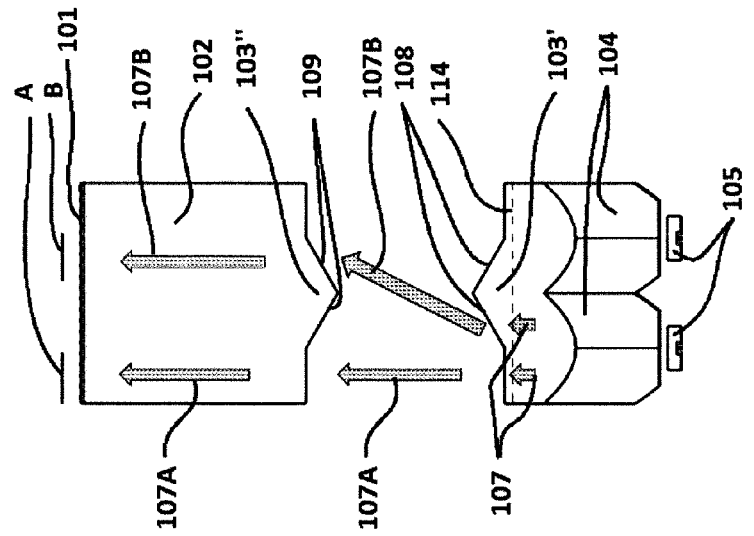
FIG. 14 shows a cross-sectional view of the third embodiment example of the light device, schematically indicating individual light beams.
Figure 13:
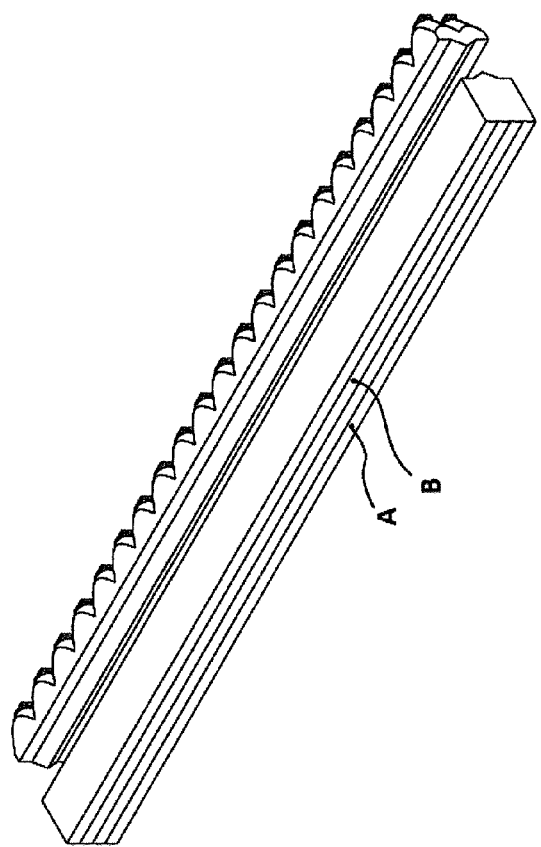
Figure 16:
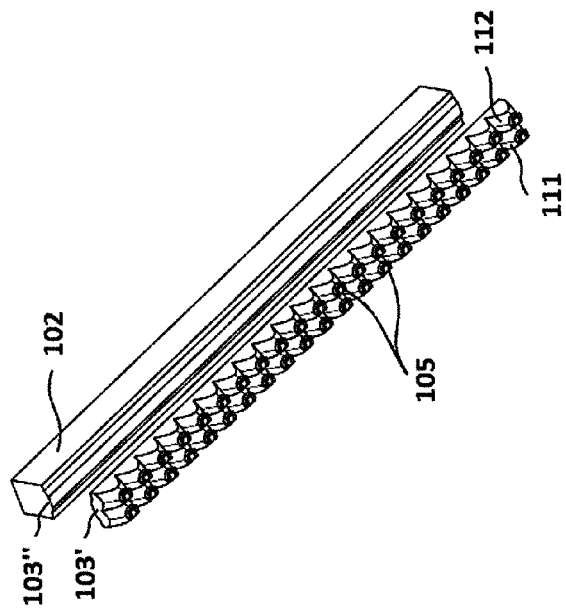
FIGS. 16, 17 and 18 show a perspective view of the fourth example of an embodiment of the light device in accordance with the invention.

FIG. 10 shows a cross-sectional view of the light device in accordance with the second embodiment with its dimensional parameters. The height y2 of the prism 103, its width x21, angle α2 and the dimension x22 are subject to the following relationship, where n2 is the refractive index of the material:

$$y2 = \frac{x22}{tg\left(\frac{\pi}{2} - \alpha 2\right)} + (x21 - x22)*tg\left(\frac{\pi}{2} - \alpha 2 + a\sin\left(\frac{1}{n2}*\sin(\alpha 2)\right)\right)$$

FIGS. 11 to 15 show the third embodiment of the light device in accordance with the invention. The light device comprises two rows 111 and 112 of light sources 105 arranged next to each other, preferably LED sources, either row being preferably used to provide one light (optical) function. The light device further comprises collimating elements 104, which can be, e.g.c collimators or lenses, and a light guide 102, which can be of the "blade" type. The optical system advantageously comprises two parts. The first part are collimating elements 104 fitted with a drawn sharp output peak 103' along the entire length of the light guide 102 and lying in the center of the output 114 of the collimating elements 104. The other part is the light guide 102 fitted with a drawn sharp input peak 103" lying against the output peak 103'. After passing through the collimating elements 104 via the output 114, the light produced by either individual row 111, 112 of light sources 105 further passes through the optical system in two ways. The first part of collimated light 107 is directly emitted from the collimating elements 104, does not change its direction and is directly bound to the light guide 102, where it produces the first light beam 107A. The other part of the collimated light 107 emitted from the output 114 of the collimators 104 is refracted at the output peak 103', namely on the refractive surface 108, then it passes through the optical system under a certain angle and is further bound to the light guide 102 through the input peak 103", namely on the refractive surface 109. This part of the collimated light 107 has changed its position in the optical system and this part produces the second discrete light beam 107B in the light guide. The optical principle is the same for the other of the rows 111, 112 and thus for the other one of the light functions. Either function produces just two bands A, B on the output surface 101.

Figure 15:
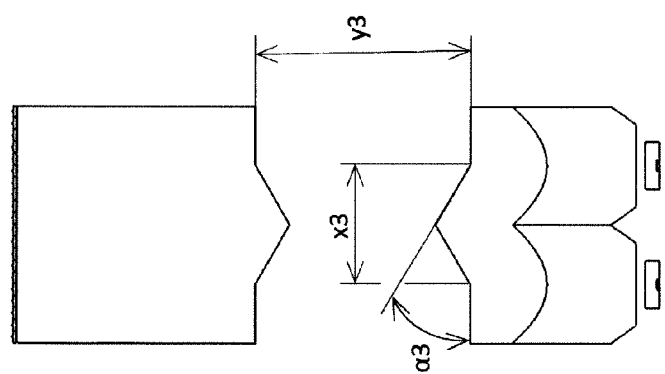
FIG. 15 shows a cross-sectional view of the third embodiment example of the light device with the indication of dimensional parameters.
Figure 17:
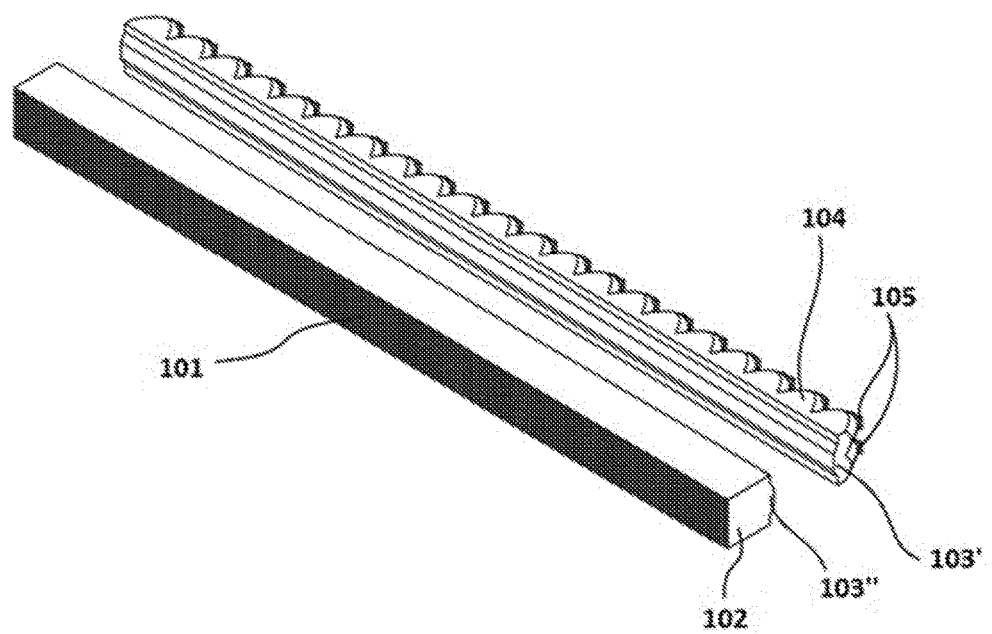
Figure 18:
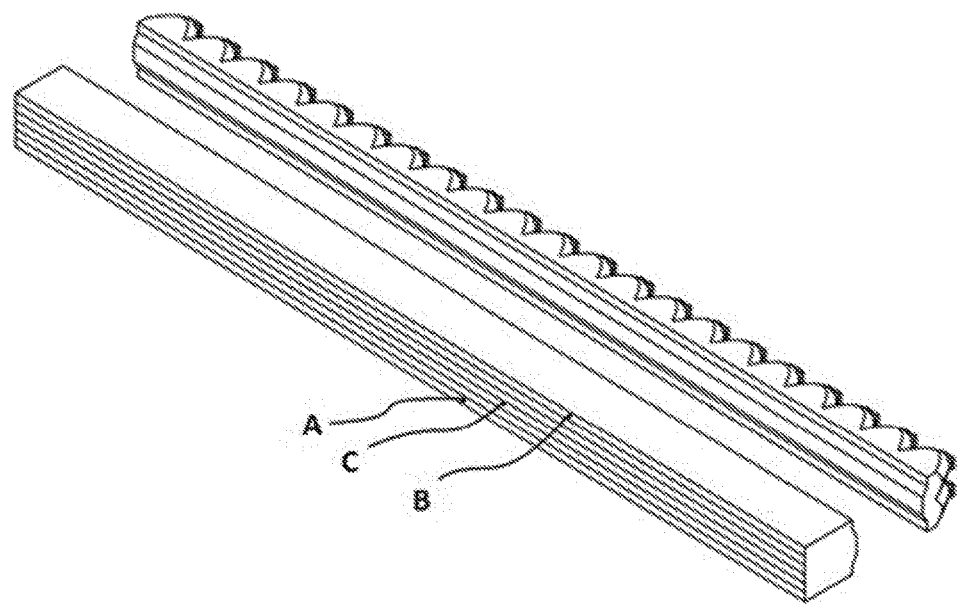

FIG. 15 shows a cross-sectional view of the light device in accordance with the third embodiment with its dimensional parameters. The distance y3 of the collimating elements 104 from the light guide 102, width x3 of the sharp peak 103', and the angle α3 are subject to the following relationship, where n3 is the refraction index of the material:

$$y3 = \frac{x3}{2}*\left(tg(\alpha 3) + tg\left(\frac{\pi}{2} + \alpha 3 - a\sin(n3*\sin(\alpha 3))\right)\right)$$

FIGS. 16 to 20 show the fourth embodiment of the light device in accordance with the invention. The light device comprises two rows 111 and 112 of light sources 105 arranged next to each other, preferably LED sources, either row can be used to provide one light (optical) function. The light device further comprises collimating elements 104, which can be, e.g., collimators or lenses, and a light guide 102, which can be of the "blade" type. The optical system advantageously comprises two parts. The first part are collimating elements 104 fitted with a drawn chamfered output peak 103' along the entire length of the light guide 102 and lying in the center of the output 114 of the collimating elements 104. The other part is the light guide 102 fitted with a drawn chamfered input peak 103" lying against the output peak 103'. After passing through the collimating elements 104 via the output 114, the light produced by either individual row 111, 112 of light sources 105 further passes through the optical system in three ways. The first part of collimated light 107 is directly emitted from the collimating elements 104, does not change its direction and is directly bound to the light guide 102, where it produces the first light beam 107A. The other part of the collimated light 107 is refracted on the refractive surface 108 at the output peak 103', then it passes through the optical system under a certain angle and is further bound to the light guide 102 through the refractive surface 109 at the input peak 103". This part of the collimated light has changed its position in the optical system and this part produces the second light beam 107B. The third part of the collimated light 107C from the collimating elements 104 passes directly through the non-refractive surface 110a at the output peak 103' without any optical change and without changing its position and is bound to the light guide 102 through the non-refractive surface 110b at the input peak 103" and produces the third light beam 107C. The said solution applies to the other optical function as well, where the principle is mirror-inverted. Thus, in this embodiment of the light device, either row 111, 112 of light sources 105 produces three separate light beams 107A, 107B and 107C, which are displayed on the output surface 101 as three discrete bands A, B and C. Since either row 111, 112 advantageously implements a separate optical function, either optical function produces the three said bands A, B and C on the output surface 101.

Figure 20:
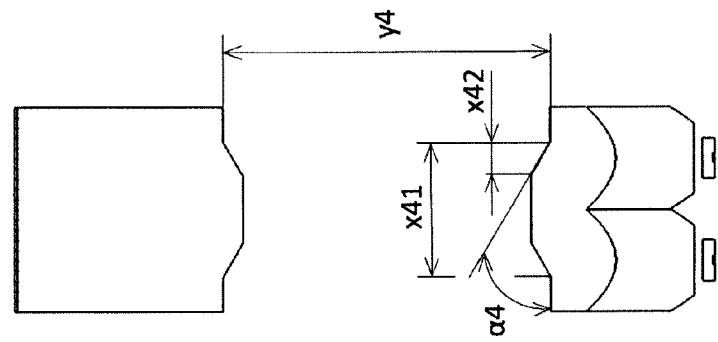
FIG. 20 shows a cross-sectional view of the fourth embodiment example of the light device with the indication of dimensional parameters.
Figure 19:
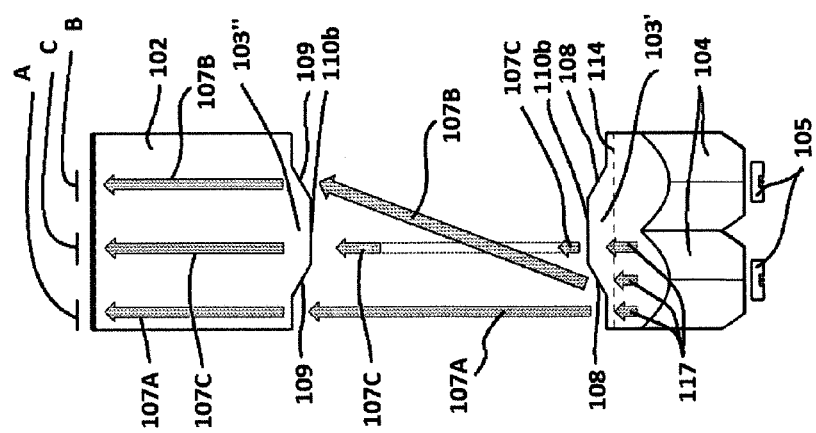
FIG. 19 shows a cross-sectional view of the fourth embodiment example of the light device, schematically indicating individual light beams.

FIG. 20 shows a cross-sectional view of the light device in accordance with the fourth embodiment with its dimensional parameters. The distance y4 of the collimating elements 104 from the light guide 102, width x41 of the chamfered peak 103', the angle α4 and the dimension x42 are subject to the following relationship, where n4 is the refraction index of the material:

$$y4 = x42*tg(\alpha 4) + (x41 - x42)*tg\left(\frac{\pi}{2} + \alpha 4 - a\sin(n4*\sin(\alpha 4))\right)$$

The above-described prism 103 and the pair consisting of the output and input peaks 103', 103" represent an optical element that can be used to divide the collimated light 107 emitted from the output 114 of the collimating element 104 into two or three separate light beams 107A, 107B, 107C. This optical element, light guide 102 and the pair of the rows 111, 112 of light sources 105 and collimating elements 104 can be symmetrical with respect to the plane on which the said two rows 111, 112 are connected.

The position of the refractive surfaces 108, 109 is preferably such that the light beams 107A, 107B, 107C are parallel to each other. However, other arrangements are also possible where the mutual position of the light beams 107A, 117B, 117C is different in a targeted way, and consequently, the bands A, B and C, which are displayed on the output surface 101, also have a different position with respect to each other. Different positions of the light beams 107A, 107B, 107C and thus the respective displayed bands A, B and C can be achieved by changing the mutual arrangement and position of the refractive surfaces 108, 109 and the other parts of the optical system described above.

As mentioned above, either of the rows 111, 112 of light sources 105 can be designed to provide a different optical function. Either of the rows 111, 112 of light sources may comprise light sources 105 of a different color.

The output surface 101 can be advantageously fitted with output optical elements, e.g. pads, or it can also be grained.

The invention also comprises other possible arrangements and modifications that fall within the scope of the attached protection claims.

LIST OF REFERENCE MARKS

101—output surface
102—light guide
103—prism
103'—output peak
103"—input peak
104—collimating element
105—light source
107—collimated light
107A—first light beam
107B—second light beam
107C—third light beam
108, 109—refractive surface
110a, 110b—non-refractive surface
111, 112—row
114—output (of a collimating element)
A, B, C—band

What we claim as our invention is:

1. A light device for a motor vehicle, comprising a first row and a second row of light sources, wherein the first row and the second row are arranged next to each other, collimating elements associated with the light sources to convert light generated by the light source to collimated light, and a light guide to bind the collimated light and to emit it from an output surface of the light guide, wherein between an output of the collimating elements and the output surface an optical element is arranged that comprises at least one refractive surface configured for a passage through the refractive surface and refraction caused by this passage, of a part of the collimated light produced by the light sources of the same row and passed through the output, producing a discrete second light beam, which is spatially separated from a first light beam comprising another part of the said collimated light that has passed through the output, which part passes by the optical element, the first light beam and the second light beam being displayed on the output surface in the form of separate bands, namely the first and second band.

2. The light device in accordance with claim 1, wherein the optical element, light guide and the pair of the rows of light sources and collimating elements are symmetrical with respect to a plane on which the said two rows are connected.

3. The light device in accordance with claim 1, wherein the optical element is a prism comprising a pair of input refractive surfaces situated in such a way that either of them is situated against the outputs of the collimating elements of one of the rows of light sources, and against the pair of the input refractive surfaces, a pair of opposite output refractive surfaces to divide the collimated light emitted from the same row into just two discrete, spatially separated light beams.

4. The light device in accordance with claim 1, wherein the optical element is an optical prism comprising a pair of input refractive surfaces arranged in such a way that either of them is situated against the outputs of the collimating elements of one of the rows, of light sources, and against the pair of the input refractive surfaces, a pair of opposite output refractive surfaces, the optical prism being connected to the outputs of the collimating elements of both the rows of the light sources in such a way that a part of collimated light emitted by the light sources of both the rows passes through the optical prism in the places of this connection, i.e. outside the area of the refraction surfaces, forming the third discrete light beam, which is displayed on the output surface in the form of a separate third band.

5. The light device in accordance with claim 4, wherein the light guide, optical prism and collimating elements of both the rows form one integral part, especially made of plastic.

6. The light device in accordance with claim 1, wherein the optical element comprises an output peak situated on the outputs of the collimating elements of both the rows, of the light sources and including two connected refractive surfaces, either of them being situated against the outputs of the collimating elements of one row of the light sources, and against the output peak, an opposite input peak situated at the input of the light guide and including two connected refractive surfaces to divide the collimated light emitted from the same row, into just two discrete, spatially separated light beams.

7. The light device in accordance with claim 1, wherein that the optical element comprises an output peak situated on the outputs of the collimating elements of both the rows of the light sources and including two refractive surfaces, either of them being situated against the outputs of the collimating elements of one row, and a non-refractive surface mutually connecting the said two refractive surfaces, and against the output peak, an opposite input peak situated at the input of the light guide and including two refractive surfaces and a non-refractive surface mutually connecting these refractive surfaces, the non-refractive surfaces being arranged for direct passage of a part of collimated light emitted from the same row through these non-refractive surfaces in the form of a discrete third light beam, which is displayed on the output surface as a separate third band.

8. The light device in accordance with claim 6, wherein the output peak and collimating elements of both the rows form one integral part together and the input peak and light guide form another integral part together.

9. The light device in accordance with claim 1, wherein the refractive surfaces and refractive surfaces are arranged in such a way for the light beams passing through the light guide to be parallel to each other.

10. The light device in accordance with claim 1, wherein either of the rows of light sources is configured to provide a different optical function.

11. The light device in accordance with claim 1, wherein either of the rows comprises light sources of a different color.

* * * * *